GEORG BERGNER.
Improvement in Pruning Shears.
No. 121,319. Patented Nov. 28, 1871.
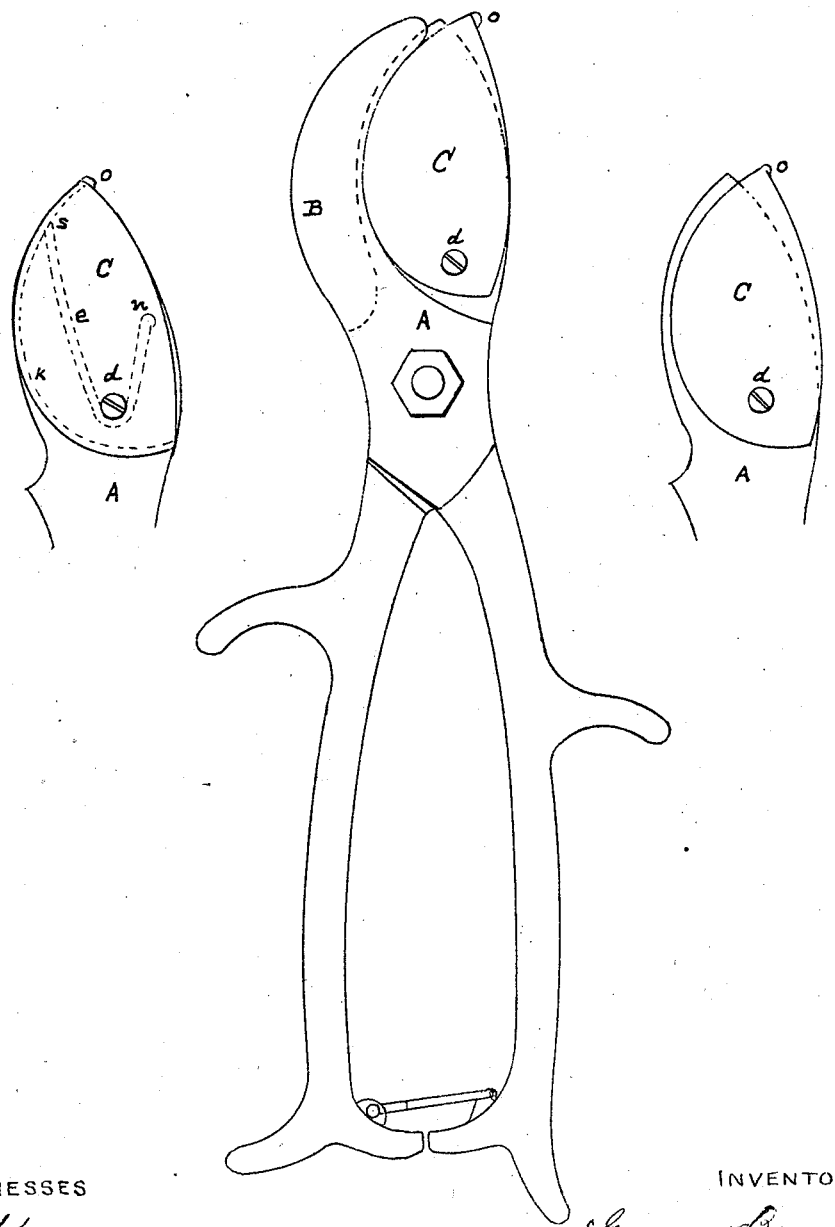

121,319

UNITED STATES PATENT OFFICE.

GEORG BERGNER, OF WASHINGTON, MISSOURI.

IMPROVEMENT IN PRUNING-SHEARS.

Specification forming part of Letters Patent No. 121,319, dated November 28, 1871.

*To all whom it may concern:*

Be it known that I, GEORG BERGNER, of Washington, Franklin county, State of Missouri, have invented a new and useful Improvement in Pruning-Shears, of which the following is a full, clear, and exact description, reference being had to the annexed drawing making a part of this specification, in which—

Figure 1 represents a pair of shears having my improvement attached. Figs. 2 and 3 represent detached views of said improvement.

Similar letters indicate like parts.

My invention consists in an attachment for pruning-shears by which the clippings may be held by the shears instead of falling to the ground after being cut off, and is intended as an improvement upon the shears patented to me August 23, 1870. My attachment may be applied to any instruments having the scissors movement; but for the sake of illustration I will confine the description of it as applied to that form of shears shown in Fig. 1.

A, Figs. 1, 2, 3, B, Fig. 1, are the blades of the shears. C, Figs. 1, 2, 3, is a plate having a broad rim, k, Fig. 2, around one edge, so that when screwed to the blade A by the screw d there may be space between it and the blade for the spring e, Fig. 2, which passes around the screw d, and is bent at one end, n, so as to enter a hole in the blade A, while the other end, s, rests against the rim k, as seen clearly in Fig. 2. At the end of the plate is a hooked projection, o, Figs. 1, 2, 3, passing over the back of the blade A. When the shears are open the plate appears as in Fig. 2; but when closed, as in Figs. 1, 3. When the blades are brought together in pruning the rim k of C is met by the blade B and forced back till the twig is cut, the spring e allowing it to yield sufficiently for this purpose, and yet keeping the pressure between them sufficiently strong to hold the twig when severed.

What I claim as my invention, and desire to secure by Letters Patent, is—

The box-plate C, provided with the raised curved rim k and hooked projection o, when pivoted on the screw d and operated upon by the spring e in the combination, substantially as shown and described.

GEORG BERGNER.

Witnesses:
　JOSEPH SCHMIDT,
　BERTHOLD STANDINGER.　　(63)